Oct. 25, 1966 A. M. ARCHER 3,281,817
INTRUDER DETECTION
Filed July 2, 1964 2 Sheets-Sheet 1

INVENTOR
ANDREW M. ARCHER
BY Ernest A. Jensen
ATTORNEY

INVENTOR
ANDREW M. ARCHER
BY Ernest P. Johnson
ATTORNEY

United States Patent Office 3,281,817
Patented Oct. 25, 1966

3,281,817

INTRUDER DETECTION

Andrew M. Archer, New York, N.Y., assignor to Specialties Development Corporation, Belleville, N.J., a corporation of New Jersey Filed July 2, 1964, Ser. No. 379,976
3 Claims. (Cl. 340—258)

The present invention relates to photoelectric intruder detecting systems, and, more particularly, to such a system which is an improvement over the system disclosed in my copending United States patent application Serial No. 379,104, filed June 30, 1964, for System for Detecting Intruders.

The aforementioned system generally comprises an electrical element such as a photoresistive type photocell which is responsive to light to change electrical values thereof and has a surface exposed to ambient light, a partition dividing the surface into two isolated portions, first and second lamps or radiation generating devices at the respective sides of the partition for exposing the surface portions to light from the lamps or devices, a source of A.C., reactance means connected in series with the element across the A.C. source, a first diode connected in series with the first lamp or device, across the A.C. source and arranged to conduct in one direction of current flow, a second diode connected in series with the second lamp or device across the A.C. source and arranged to conduct in the opposite direction of current flow whereby the lamps or devices are alternately illuminated to alternately expose the surface portions to an equal higher and lower radiation intensity, the reactance means having an output upon being charged unequally at opposite sides in sequence, and an alarm control network responsive to the output of the reactance means.

When the optical system for the photoelectric element is adjusted so as to restrict the field of view to permit the element to see only a selected uniform surface area on which the focal axis is directed, both surface portions are equally illuminated by ambient light and react at the same point on a response curve and their response rates are equal to each other. However, in such a system, no provision is made for the element to react at a fixed point on a non-linear portion of the response curve when there are substantial changes in the intensity of ambient light which the element sees.

Accordingly, an object of the present invention is to provide a photoelectric intruder system which is unaffected by substantial changes in the intensity of ambient light within the area to be monitored by the element.

Another object is to provide such a system wherein the intensity of the ambient light to which the element is exposed is readily adjusted to a desired level.

A further object is to provide such a system which is simple, practical and economical.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system of the type described herein which includes aperture means such as an iris diaphragm having an adjustable opening for directing ambient light onto the cell surface which has an opening so dimensioned that the cell responds at or near its cut-off when the ambient light is at maximum intensity.

A preferred embodiment of the invention has been chosen for purposes of illustration and description, and is shown in the accompanying drawings, forming a part of the specification, wherein.

Figure 1:
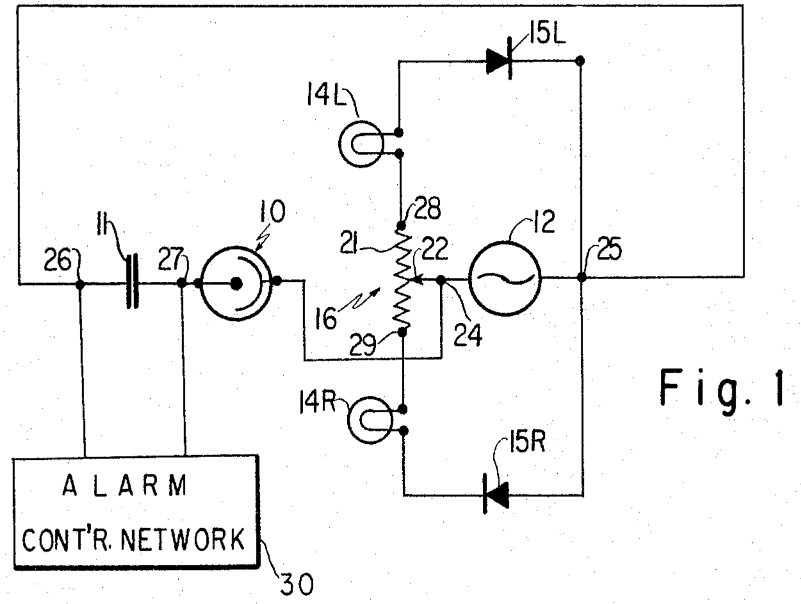
FIG. 1 is a circuit diagram of a network in accordance with the present invention.

Referring now to FIG. 1 of the drawing in detail, there is shown an intruder detecting system in accordance with the present invention which generally comprises a photoresistive type photocell 10, a capacitor 11, a source of A.C. 12, an iris diaphragm 13, a pair of lamps 14L and 14R, a pair of diodes 15L and 15R, a potentiometer 16 and an alarm control network 30.

Figure 2:
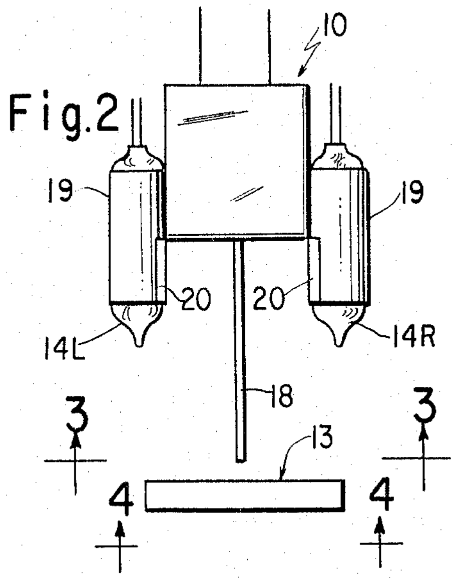
FIG. 2 is a top plan view illustrating the physical relationship of a photocell, two lamps, a partition between the lamps and an iris diaphragm in front of the cell.
Figure 3:
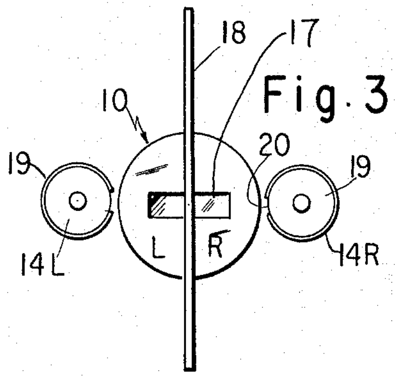
FIG. 3 is a front elevational view along the line 3—3 on FIG. 2.

As shown in FIGS. 2 and 3, the cell 10 has a window 17 which is exposed to ambient light and is divided into left and right isolated surface portions L and R by an opaque partition 18 extending vertically outwardly of and across the window at the middle thereof. The lamps 14L and 14R are mounted diametrically opposite and adjacent the left and right sides of the cell, respectively; and have a shield 19 thereon formed with a window 20 for directing the light of the lamps on the window portions L and R, respectively.

Figure 4:
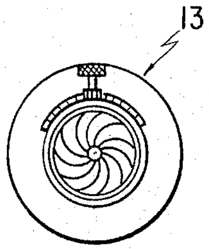
FIG. 4 is a front elevational view along the line 4—4 on FIG. 2.

As shown in FIGS. 2 and 4, the iris diaphragm is positioned in front of the window 20 with the center of the diaphragm opening being axially aligned with the midpoint of the window and the partition 18 so that the light passing through the opening is equally divided and the window portions L and R are subjected to ambient light of the same intensity for any given setting of the diaphragm opening.

The lamps 14L and 14R may be miniature incandescent or neon lamps or equivalent means for generating other radiations such as heat or a magnetic field to which the cell 10 responds. In the illustrative embodiment neon lamps are utilized.

The potentiometer 16 includes a resistor 21 and an adjustable voltage dividing contact 22 connected to one terminal 24 of the A.C. source 12. The cell 10 and the capacitor 11 are connected in series across the terminals 24 and 25 of the A.C. source, and the alarm control network 13 is connected across the terminals 26 and 27 of the capacitor.

The lamp 14L and the diode 15L are connected in series between one tereminal 28 of the resistor 21 and the A.C. source terminal 25; and the lamp 14R and the diode 15R are connected in series between the other terminal 29 of the resistor. The diodes are so arranged that one conducts on one half cycle of A.C. and that the other conducts on the other half cycle of A.C. to alternately illuminate the lamps 14L and 14R.

In operation, when the diode 15L conducts, the lamp 14L is illuminated and light is directed onto the cell window portion L and for that half cycle current flows through the cell 10 from right to left to charge the capacitor 11 at the terminal 27 thereof. When diode 15R conducts, the lamp 14R is illuminated and light is directed onto the cell window portion R and for that half cycle current flows through the cell from left to right to charge the capacitor at the terminal 26 side thereof.

When there is no intruder in the area viewed by the window of the cell, the cell window portions L and R are alternately exposed to light of equal intensity and the capacitor will be charged alternately equally at opposite sides thereof and has no output.

However, when an intruder enters the area, a window portion on one side of the partition sees the image and the intensity of the ambient light viewed by that window portion changes when its lamp is illuminated, whereupon the capacitor is charged unequally at opposite sides thereof in sequence and the difference in charge produces an output capable of operating the alarm control network.

Figure 5:
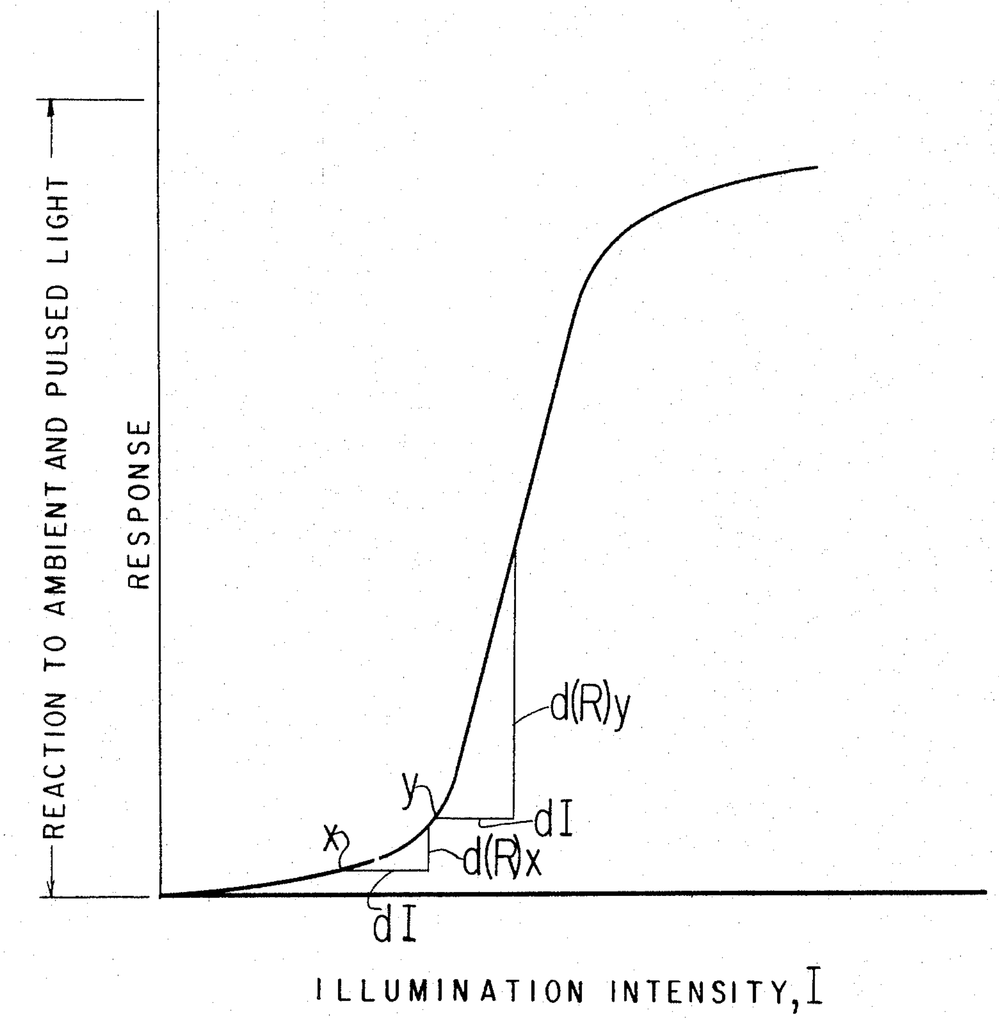
FIG. 5 is a graph illustrating the response curve of the photocell in relation to the illumination of the cell.

The functioning of the system is best explained with reference to FIG. 5 wherein a graph is shown which illustrates the response curve of the cell at various levels of intensity of illumination on the window portions, for example, the window portion L. This curve has a linear portion in the middle and has curved or non-linear portions at its upper and lower ends. The intensity of the ambient light upon the cell is adjusted by setting the iris diaphragm so that when the lamp 14L is off the response is on a lower portion of the curve at or near the cut-off in brightest of ambient light within the area to be monitored. When the lamp 14L is illuminated the response is at a point X on a higher and non-linear portion of the curve. Since both window portions are subjected to the same intensity of illumination in the absence of motion, the left portion L response $(R)_L$ will be equal to the right portion R response $(R)_R$ whereby there is no change in response between successive one half cycles of the cell and $d(R)_L = d(R)_R$ and $$\frac{d(R)_L}{dI_L} = \frac{d(R)_R}{dI_R}$$

However, assuming that the right window portion R sees an intruder, a different amount of light will fall on the cell during that half cycle when the lamp is energized, and the cell will respond at a different non-linear portion of the curve as indicated by the point $y$, whereby at $x$ $$\frac{d(R)_L}{dI_L}$$

will be very unequal to $$\frac{d(R)_R}{dI_R}$$

at $y$, due to the magnitude of change in response rate. Thus, the capacitor will be charged very unequally at opposite sides in sequence to produce a strong alarm actuating signal.

While the present invention has been described with reference to a system devoid of moving parts such as disclosed in my application Serial No. 379,104, filed June 30, 1964, it is contemplated that the ambient light adjusting arrangement could likewise be embodied in systems such as disclosed in my copending application Serial No. 378,129, filed June 26, 1964, for Intruder Detecting System.

I claim:

1. An ambient light responsive system for detecting the presence of an intruder within any portion of an area under surveillance comprising an electrical element responsive to light to change electrical values thereof and having a surface exposed to and responsive to changes in ambient light reflected from said area which reflected light is changed in intensity by the presence of an intruder that reflects light to a different degree than the portion of the area obscured by the intruder, means for alternately exposing two portions of the surface of said element to an equal higher and lower light intensity, reactance means, a power source for operating said alternately exposing means and for passing a current through said reactance means which reverses direction in synchronism with said alternately exposing means, said element being connected to vary the current flowing through said reactance means in response to the light intensity on said surface, whereby said reactance means discharges to produce an output upon being charged unequally at opposite sides in sequence, means responsive to the output of said reactance means for rendering an alarm, and aperture means for directing ambient light onto said surface having an opening so dimensioned that said element responds at or near its cut-off when the ambient light is at maximum intensity.

2. A system according to claim 1 wherein said aperture means is adjustable to vary the dimensions of the opening thereof.

3. A system according to claim 2, wherein said aperture is an iris diaphragm.

References Cited by the Examiner

UNITED STATES PATENTS

| | | | |
|---|---|---|---|
| 1,877,279 | 9/1932 | Dawson | 340—228 |
| 2,227,147 | 12/1940 | Lindsay | 340—258 |
| 2,442,690 | 6/1948 | Hoffman | 250—221 X |
| 3,143,655 | 8/1964 | Strandberg | 250—239 |

FOREIGN PATENTS

| | | |
|---|---|---|
| 309,837 | 8/1930 | Great Britain. |

NEIL C. READ, *Primary Examiner.*

R. M. GOLDMAN, *Assistant Examiner.*